United States Patent Office 2,816,022
Patented Dec. 10, 1957

2,816,022

SMELTING OF LEAD-CONTAINING ORES

Stephen William Kenneth Morgan and George Kenneth Williams, Bristol, England, assignors, by mesne assignments, to Metallurgical Processes Limited and The National Smelting Company Limited, doing business as Metallurgical Development Company, Nassau, Bahamas No Drawing. Application April 6, 1954,
Serial No. 421,450

Claims priority, application Great Britain April 10, 1953

18 Claims. (Cl. 75—87)

This invention relates to the smelting in a blast furnace of metalliferous materials containing lead and zinc and has for its object the provision of a blast-furnace smelting process for a wide variety of metalliferous materials containing lead and zinc values in which most of the lead and zinc are separately recovered in the form of metal. Throughout this specification and the appended claims metalliferous materials containing lead and zinc are to be understood as ores, concentrates, metallurgical products and any and all other metalliferous materials containing lead or zinc or both in amount susceptible of being recovered as metal in the blast furnace smelting process of the invention.

To the best of our knowledge, no economical single pyrometallurgical process for treating lead-zinc ores with the direct and separate recovery of both lead and zinc as marketable lead metal and zinc metal, respectively, has heretofore been successfully practiced on a commercial scale. On the contrary, the successful pyrometallurgical treatment of lead-zinc ores has generally been possible only when the compounds of these two metals can be separated by some process of differential concentration, such as froth flotation. Even in favorable circumstances, such separation processes generally yield a zinc concentrate containing at least one percent of lead and a lead concentrate containing several percent of zinc.

The pyrometallurgical method usually practiced for the production of metallic zinc from such zinc concentrates comprises distilling a mixture of the oxidized concentrate with carbonaceous material to produce a gaseous mixture of zinc vapour and carbon monoxide from which zinc is condensed out as liquid metal. The heat required in this method is furnished by electrothermic heating or by enclosing the charge in externally heated retorts. In this method, lead is volatilized to an extent limited by the vapour pressure of lead at the temperature at which the gaseous mixture of zinc vapour and carbon monoxide leaves the heated charge. With vertical retorts, for example, the lead volatilized is generally found to be about 0.1% to 0.2% of the weight of zinc distilled, being but little influenced by the amount of lead present in the charge, provided that the charge contains sufficient lead to thus saturate the gaseous mixture. The remainder of the lead in the charge is left in the retort residues and is lost when these are discarded as valueless. Various processes, such as heating in rotating kilns, have been proposed and sometimes used for recovering the lead, together with any residual zinc, from zinc retort residues, but such processes are expensive to operate and generally yield merely a mixture of zinc and lead oxides.

Lead concentrates are generally smelted in blast furnaces, which are so operated that substantially all of the zinc goes into the slag as oxide or oxidized compound of zinc. By suitably controlling the flux additions, it is possible to operate lead blast furnaces so that the slag contains up to 25% zinc. The amount of zinc that can be tolerated in the charge to a lead blast furnace therefore depends on the weight of slag produced. With the amounts of gangue material usually present in the ore and of fluxes customarily added, serious difficulties arise when the zinc content of the smelting charge is more than one quarter of the lead content. Zinc is thus a particularly undesirable impurity in the charge to a lead blast furnace. The zinc present is lost when the slag is discarded as valueless. Sometimes such zinciferous blast-furnace slags are treated by blowing pulverized fuel into the molten slag and recovering zinc as zinc oxide from the hot gases thus generated, but this process is expensive in fuel and depends very much for its economic feasibility on finding a useful outlet for the large amount of heat contained in the gases so generated. Such zinciferous slags have also been treated by passing an electric current through the liquid slag, with a layer of coke on the surface thereof, and condensing metallic zinc from the gaseous mixture generated; to the best of our knowledge, this process becomes economically feasible only when the bulk of the slag to be treated is already available in molten form, so that in practice the process is applicable only to the treatment of lead blast-furnace slags as they leave the furnace.

We have been actively associated in the development of an improved process of smelting zinc ores in a blast furnace of which some of the outstanding characteristic features are described in United States Patent 2,671,725 of Robson and Derham granted March 9, 1954, and the copending application of Woods Ser. No. 374,322, filed August 14, 1953. Heretofore, no more lead has been tolerated in the zinc ore to be blast-furnace smelted by that process than heretofore customary in the aforementioned pyrometallurgical method for treating zinc concentrates. As the result of our investigations of the effect of increasing the lead content of the smelting charge in that process we have found, as indeed might have been expected, that some of the lead reduced in smelting is volatilized and some can be tapped from the bottom of the furnace. In addition, however, we have discovered that, in one respect, lead behaves more favorably than might have been anticipated, in that the improved zinc-smelting blast-furnace process takes lead in its stride, and no further addition of carbonaceous fuel is required for the reduction of additional lead oxide to lead metal, while the amounts of zinc and gangue materials are kept constant. On the other hand, we have discovered that the presence of additional lead in the smelting charge causes certain disturbances to the operation of the furnace and the condenser, and one aim of the present invention is to overcome these disturbances by certain modifications of the operating conditions.

The most abundant ore of zinc is its sulphide, zinc blende. A zinc-smelting blast-furnace requires the zinc to be present mainly as oxide or oxidic compounds. Accordingly, sulphide ores are roasted before being charged to the blast-furnace, this roasting preferably being combined with or followed by a sintering process which yields a product in a suitable physical condition for charging to the furnace. While such roasting eliminates most of the sulphur, some sulphur is always still present in the product. In addition, carbonaceous fuels, such as coke, nearly always contain some sulphur. When using a blast-furnace for smelting oxidized zinc ores containing only small amounts of lead no serious operational difficulties are encountered owing to the presence of this sulphur. Some small amount of sulphur is volatilized and is found, present as zinc sulphide, in the dross formed in the condenser and in the blue powder recovered by water scrubbing of the gases leaving the condenser. Most of the sulphur is present in the slag tapped from the bottom of the furnace; when sufficient is present to saturate the slag, a sulphur-rich matte, of which the main component is ferrous sulphide, separates from the slag. When copper and silver are present in the zinc ore, it is advantageous to have present sufficient sulphur to form a matte, since the copper and silver are thus collected as sulphides in solution in the ferrous sulphide.

When small amounts of lead compounds are added to the zinciferous blast-furnace charge, all the lead is volatilized and there is some increase in the amount of sulphur volatilized. So long as the total lead introduced is not greater than about one tenth of the weight of carbon burnt in the furnace, the additional amount of sulphur volatilized is not large and it leads to no serious operational difficulties. Further additions of lead, however, cause operational difficulties of two types.

Sometimes the introduction into the charge of lead amounting to 15% or more of the weight of carbon burnt in the furnace causes no immediate operational difficulties. Some lead metal is tapped from the bottom of the furnace. The amount of sulphur volatilized does not rise unduly. After some period of operation, generally a few weeks but sometimes only a few days if lead and sulphur are present in the charge in very large amounts, furnace pressures rise unduly. Opening up the furnace then reveals that this is due to the formation of an accretion of interlocked acicular crystals of sulphide round the furnace offtake. This type of behaviour is often encountered with a relatively small pilot-scale furnace using an inverted-trough offtake, as described in the copending United States patent application of Derham, Ser. No. 158,190, filed April 26, 1950.

Sometimes the introduction of lead into the charge in amounts up to 25% or even more of the weight of carbon burnt leads to no lead being tapped from the bottom of the furnace. Instead, all the lead is volatilized and at the same time the amount of sulphur volatilized rises considerably. A statistical study of a large number of data attained on a full scale furnace shows that the ratio of additional sulphur volatilized to additional lead volatilized, with this lead in the range between 10% and about 30% of the weight of carbon burnt, corresponds quite closely to the chemical equivalents of sulphur and lead, that is to say, in the ratio of 32/207. This type of behaviour is encountered particularly with a full scale furnace working at a higher blasting rate per unit area and with a rather coarser charge than is customarily used on the small pilot-scale furnace. This associated volatilization of lead and sulphur can sometimes proceed to the point at which nearly all the sulphur is volatilized leaving in the extreme case only about 0.2–0.3% sulphur in the slag although the total sulphur present in the charge would be sufficient to give 1.0–1.5% sulphur in the slag, all the remainder being volatilized.

In conjunction with our operations on a full-scale furnace and experiments on a pilot-scale furnace, we have carried out laboratory investigations to elucidate the mechanism of this transport of sulphur in the furnace. These show that when the charge to a zinc-smelting blast-furnace contains iron oxides as the predominant non-zinciferous component and no free lime is present, the thermodynamically stable condensed form in which any sulphur present can exist at temperatures below about 1050° C. is zinc sulphide, whereas at higher temperatures ferrous sulphide becomes the stable form. If free lime is present the stable form of sulphur becomes calcium sulphide at temperatures prevailing in any zone of the blast-furnace. The temperature at which the gases leave the furnace charge is generally between 950° C. and 1000° C., typically 975° C. At 975° C. the vapour pressure of lead is such that in a saturated lead vapour the weight of lead is equal to about 7% (the corresponding figures being approximately 5% for 950° C. and 10% for 1000° C.) of the weight of carbon contained in the carbon monoxide and carbon dioxide, this weight of carbon corresponding, of course, to the weight of carbon burnt in the furnace. In the reaction $$ZnS + Pb\ (liquid) = Zn\ (gas) + PbS\ (gas)$$

the equilibrium at 950–1000° C. is such that with zinc present in a volume of concentration of 5–6%, the volume concentration of lead sulphide in the gas will be about 1/5 of the volume concentration of lead vapour; that is to say, at equilibrium some lead sulphide, but in relatively small amounts, would leave the furnace as gas. At the bottom of the furnace where the temperature may be 1100° C. or higher, the equilibrium between liquid lead and ferrous sulphide with metallic iron is such that a considerable concentration of lead sulphide can be present at equilibrium; if free lime is present equilibrium is attained here with the formation of calcium sulphide and the presence in the gas of a lower but still appreciable concentration of lead sulphide, and the lime in the upper parts of the furnace can react with this lead-sulphide vapour so that the amount of sulphur finally volatilized from the furnace becomes greatly reduced.

In the light of equilibrium studies it can be seen if the amount of lead added to a charge does not exceed about 7% of the weight of carbon burnt, all this lead can be volatilized as lead vapour and will tend to carry with it only a small concentration of lead sulphide. Once a larger amount of lead is added to the furnace not all of it can be volatilized from the upper zones of the furnace. Some liquid lead goes down to the hotter zones of the furnace. Here it reacts with zinc sulphide, iron sulphide or any other sulphur compounds present to form a considerable concentration of lead sulphide vapour. Passing up to the furnace this lead sulphide vapour, if it attains equilibrium with the zinc vapour in the upper part of the furnace, mostly reacts according to the equation $$PbS\ (gas) + Zn\ (gas) = Pb\ (liquid) + ZnS\ (solid)$$

Some of this zinc sulphide may be deposited as an accretion. On the other hand, under certain operating conditions this lead sulphide vapour may escape reacting with zinc vapour in the furnace and be transported as such to the condenser. Here it reacts to give presumably very small droplets containing zinc sulphide and lead in intimate admixture. The mixed droplets of zinc sulphide and lead are not readily carried down by the spray of lead thrown up in the condenser; and act as nuclei for the deposition of more liquid zinc, which in turn cannot readily be trapped in the condenser. As a consequence more dross is formed in the condenser. In so far as the droplets are carried forward they are recovered, with their associated condensed zinc, in the blue powder subsequently recovered in the water scrubbers. Indeed, a statistical study of a number of operating periods on a fullscale furnace has shown that each additional 1.0 lb. of sulphur volatilized from the furnace causes the formation of an additional 14.8 lbs. of dross and blue powder, containing 5.5 lbs. of lead and 6.1 lbs. of zinc.

In the light of these facts we have found it necessary when operating with mixed lead zinc ores to take special precautions to eliminate the sulphur more completely during the roasting than would have been otherwise regarded as necessary. A statistical study of the results shows that the harmful effect of sulphur is proportional to the amount present. Within the ranges that can practically be attained there is no lower limit below which the sulphur present can be regarded as not being harmful. So long, however, as the sulphur is below 0.8%, the effect is not unduly serious. We regard the 1.5% of sulphur in the metalliferous materials charged as the upper limit to be tolerated to obtain reasonable operating conditions.

It has been customary to add some lime to the blast furnace charge to obtain a slag of suitable composition.

From the point of view of slag composition it does not matter in what form the lime is introduced and experiments were made with adding this lime as a slag, the lime being already combined as calcium silicate. It was discovered, however, that the amount of sulphur volatilized was reduced by having free lime as such present in the charge. The reason why this was so was explained by the aforementioned laboratory investigations, that is, the formation of calcium sulphide. When smelting mixed lead-zinc ores therefore, it is preferable to have free lime present in the charge. It has been found that even if the lime is incorporated with the ore before it is sintered or sinter-roasted, much of the lime is still present in the free state or at least in the form of some compound which is substantially as active as free lime with respect to reducing the volatilization of sulphur from the furnace.

Another procedure that was found helpful in reducing the amount of sulphur volatilized was to introduce some metallic iron in the charge. This was more effective in helping to trap sulphur than the oxidized iron compounds which are nearly always present. In general, however, this is a less preferred method than the use of lime, both because the lime is somewhat more effective and because addition of lime is often required as a slag component, whereas to form a suitable slag it is not generally desired to add more iron.

With mixed lead-zinc ores it is undesirable to have sufficient sulphur reaching the bottom of the furnace to form a sulphide matte. An alternative procedure must therefore be followed to recover any silver and copper present. We find that when lead metal is tapped from the bottom of the furnace, this dissolves nearly all the silver and most of the copper, so that these metals can still be recovered.

It was thus established that, contrary to expectations, it was important to keep the sulphur content of the smelting charge as low as possible, since the joint presence of lead and sulphur produced unanticipated objectionable effects in both furnace and condenser.

It was further found that the lower the temperature at which the gases are withdrawn from the smelting charge, the lower is the amount of lead sulphide vapour carried by the gases, and therefore the lower the amount of zinc sulphide fume present in the condenser. The gases at the point at which they last make contact with the furnace charge must be at a temperature at which the zinc vapour contained therein cannot react with carbon dioxide to produce zinc oxide according to the reaction, $$Zn+CO_2=ZnO+CO$$

The equilibrium constant in this reaction is such that, for instance, a gas containing by volume 6% zinc vapour, 7% carbon dioxide and 25% carbon monoxide can have a continued stable existence at temperatures only above 965° C., while a gas containing 6% zinc vapour, 10% carbon dioxide and 22% carbon monoxide can have a continued stable existence only above 1000° C. In order to reduce the amount of lead-sulphide vapour carried from the furnace, it is desirable that the gases should leave the furnace charge at a temperature only slightly above the equilibrium temperature at which zinc vapour could react with carbon dioxide to produce zinc oxide. It was also found that in the previously preferred form of inverted trough gas offtake, below the top level of the smelting charge, the gases were superheated slightly above their equilibrium temperature. By taking the gases off from the top of the charge, it was found that the lead sulphide content of the gases was reduced, since at this point the gases are cooled to approximately the equilibrium temperature for the reversible reaction $$Zn+CO_2 \rightleftarrows ZnO+CO$$

But while this alleviates the sulphur trouble, it accentuates the tendency for zinc vapour to oxidize during the transfer of the gases to the condenser, as hereinafter pointed out.

In operating a zinc blast furnace the ratio of zinc volatilized to the carbonaceous material consumed depends on the heat balance, which can, of course, be improved if operating conditions are so controlled that more air is consumed per unit of carbon and hence a greater proportion of the carbon is oxidized to carbon dioxide instead of to carbon monoxide. We have found, however, that it is impossible to generate a gas containing a very large amount of carbon dioxide and at the same time to attain a good zinc elimination. We find that when good operating conditions are being attained the volume percentage of carbon dioxide in the gas leaving the charge does not greatly exceed that of the zinc vapour; typically the gas leaving the charge contains about 5% zinc and about 6% carbon dioxide, and after admixture of air or oxygen the content of carbon dioxide may rise to about 7%.

The reason why the gas leaving the charge should contain zinc vapour and carbon dioxide in a volume concentration not greatly exceeding that of the zinc vapour can be explained most readily in relation to a furnace in which the gases are withdrawn from the top of the charge and the whole of the air blast is introduced at the bottom of the furnace, so that flow of charge and gases is counter-current throughout the furnace.

Analogously with other metallurgical blast furnaces the gas generated at the bottom of a zinc-smelting blast furnace contains carbon monoxide, which in its passage up the furnace can reduce zinc oxide according to the equation $ZnO+CO=Zn+CO_2$. This reaction absorbs a large amount of heat, so that, if carbon monoxide constituting 1% by volume of the gas thus reacts with zinc oxide to give 1% by volume of zinc vapour in the gas, the heat required with countercurrent flow of charge and gas will reduce the temperature of the gas by about 50° C. The temperature at which the charge components begin to melt may be in the region of 1100–1150° C.; the gases finally leave the furnace charge at not much below 1000° C. Consequently only about 3% by volume of zinc vapour can be formed by reduction of zinc oxide by carbon monoxide below slag-melting temperatures. Once a slag has been formed it takes zinc oxide into solution, and such zinc oxide dissolved in slag is more difficult to reduce than free zinc oxide; also, some of the zinc may initially be introduced as difficultly reducible compounds, such as silicate or aluminate; to ensure that as much as possible of such zinc is reduced and liberated as zinc vapour, it is necessary that the gaseous atmosphere there should be as reducing as possible; therefore conditions must be so controlled that the air blast introduced at the bottom of the furnace reacts with the carbonaceous material to give initially mostly carbon monoxide with relatively little carbon dioxide. As the gases travel up the furnace the carbon monoxide reacts with zinc oxide and other readily reducible oxidic zinc compounds, according to the equation, $$ZnO+CO=Zn+CO_2$$

thus producing equal volumes of zinc vapour and carbon dioxide. During the travel of the gases up the furnace, some carbon dioxide reacts with carbon according to the equation, $$CO_2+C=2CO$$

but this reaction takes place to only a small extent. Consequently, the overall carbon dioxide content does not greatly exceed that of the zinc vapour.

We have discovered that the zinc vapour in the blast-furnace gases can be efficiently condensed to zinc metal with a much higher content of carbon dioxide in the gases than heretofore thought possible. This opened up new possibilities in the blast-furnace smelting of lead-zinc ores with an economical consumption of fuel which we have further discovered, as a result of our investigations.

Simplified, the operation of the lead-zinc blast furnace may be regarded as depending on the generation of carbon monoxide in the furnace and these two reactions:

$$PbO + CO = Pb \text{ (liquid)} + CO_2$$
$$ZnO + CO = Zn \text{ (gas)} + CO_2$$

The first reaction is exothermic and therefore is a source of heat. The second reaction is highly endothermic. We have found that a primary prerequisite for commercially successful lead-zinc blast-furnace smelting is maintenance of a reducing environment throughout the smelting charge at a temperature sufficiently high to reduce and volatilize zinc with an amount of carbonaceous material in the charge not substantially greater than that needed to provide the heat required for smelting the zinc. Good zinc elimination is thus attained, and the carbon dioxide content of the blast furnace gases may be increased (by the reduction of lead oxide mostly above and partly in the slag) to around 11% without objectionably impairing the condensation of zinc vapour to zinc metal.

Based on the foregoing discovery and observations the present invention contemplates improvements in the method of operating a blast furnace in which a preheated charge containing oxidic zinc materials and carbonaceous fuel is introduced into the top of the furnace, preheated air is blown into the bottom of the furnace, molten slag is tapped from the bottom of the furnace and a gas containing zinc vapour, carbon monoxide and carbon dioxide is withdrawn from a higher part of the furnace, in accordance with which a substantial amount of oxidic lead compounds is incorporated in the charge and the amount of combustible carbon charged is regulated so that the heat generated by combustion of this carbon in the preheated air to produce a mixture of carbon monoxide and carbon dioxide in such a ratio that this gaseous mixture is highly reducing to the oxidic zinc and lead compounds present in the slag initially formed in the furnace, together with the heat generated by the exothermic reaction between the oxidic lead compounds and carbon monoxide to produce lead metal and carbon dioxide, is substantially no more than that necessary (a) for compensating for heat losses from the furnace, (b) for reducing the oxidic zinc compounds endothermically by carbon monoxide to produce zinc vapour and carbon dioxide, (c) for melting substantially all of the charge components other than zinc oxide, lead oxide and carbon, and maintaining the resultant slag at such an elevated temperature that substantially all the zinc and lead oxides dissolved therein are reduced to liberate zinc vapour and lead metal, (d) for raising the temperature of the gases in the zone of the furnace where they last make contact with the furnace charge to a point at which the zinc vapour contained therein cannot react with the carbon dioxide contained therein to form undesired zinc oxide, and (e) for volatilizing some of the lead metal formed, the amount of lead volatilized not being substantially above that unavoidable minimum amount required to saturate the gases leaving the charge with lead vapour at the temperature at which these gases finally leave the charge; and withdrawing molten lead from the bottom of the furnace.

The smelting charge and the air blown into the furnace are preferably preheated to temperatures of at least 600° C. and 500° C., respectively. Alternatively, the carbonaceous material (e. g. coke) of the smelting charge may be separately preheated, in which case the carbonaceous material may be more highly heated (say 800–1000° C.) while the other charge materials (preferably sintered) are heated to a lower temperature (say 500–750° C.), the separate heating temperatures being correlated to impart to the charge as a whole an average or mean temperature between 600 and 900° C. when introduced into the blast furnace. Such separate preheating of the carbonaceous material and other charge materials is advantageous where the latter are sintered and the lead content is relatively high, since lead lowers the temperature at which the sinter tends to soften.

As hereinbefore mentioned, the reduction of zinc oxide by carbon monoxide is a highly endothermic reaction, but the reduction of lead oxide by carbon monoxide is an exothermic reaction and the heat evolved in the latter reaction beneficially contributes to the maintenance of the necessary highly heated smelting charge. As a consequence of preheating the charge and the air blast, a relatively large amount of extraneous heat is introduced into the furnace. The preheated air blast in conjunction with locally consumed coke provides the necessary large amount of heat locally required to maintain a relatively high temperature in the furnace hearth. The smelting charge should contain sufficient zinc to justify a condensing stage for zinc vapour in the blast furnace gases and should contain lead in such amount that molten lead metal is tapped from the bottom of the furnace along with a slag of low zinc content. As already explained, no fuel is required for the reduction of the lead oxide. The amount of lead that can be reduced is governed by the consideration that the total carbon-dioxide content of the gas should not greatly exceed 11% by volume. This limit is generally attained when the weight of lead introduced is about 2.5 times the weight of carbon burnt.

As hereinbefore explained, the fuel value of the carbon burnt, in conjunction with the sensible heat introduced with the air blast and with the solid materials charged, is used for a number of purposes, the most important of these being for counteracting heat losses from the furnace, for melting as a slag the materials other than lead oxide and zinc oxide present in the charge (including the coke ash), for reducing the zinc oxide and for raising the temperature of the gaseous products of the reaction; compared with the foregoing items, the amount of heat required for volatilizing the relatively small amount of lead needed to saturate the gases leaving the furnace charge with lead vapour is comparatively small, and, in general, the amount of heat required to reduce and volatilize the quantities of other volatile metals, such as cadmium, that may be present is negligibly small. The ratio of fuel burnt to zinc volatilized therefore depends on a number of factors, such as the temperatures to which the air blast and the charge are preheated, the heat loss from the furnace and the amount of slag forming materials present. On a typical furnace, with charge preheated to 800° C. and air blast to 600° C., the carbon consumption may be calculated as the sum of 90% of the weight of zinc to be volatilized, and 20% of the weight of slag to be formed. With a high-grade mixed zinc-lead ore in which the weight of slag formed may be 70% of the weight of zinc present, this means that the carbon consumed might be about 104% of the weight of zinc reduced and volatilized. For reasons hereinbefore discussed, the sulphur content of the smelting charge should not exceed 1.5%, and preferably should not exceed 0.8%.

The gaseous product resulting from the smelting operation (blast furnace gases) is withdrawn from the furnace and transferred through a suitable flue system to a shock-chilling condenser, such as a lead-splash condenser, where about 90% of the zinc vapour in the gases is condensed and recovered as molten zinc metal. The blast furnace gases contain a relatively large volume of nitrogen (e. g. 61–63%), a relatively smaller volume of carbon monoxide (e. g. 24–27%), a relatively small volume of zinc and lead vapours (e. g. 5–6%), and a volume of carbon dioxide corresponding approximately to that generated by reduction by carbon monoxide of the zinc oxide and lead oxide present in the charge (e. g. 6–10%). In practice, the volume of lead vapour in the blast furnace gases will be around 3% of the volume of zinc vapour therein, and the balance of the lead included in the smelting charge, exclusive of the very small amount of lead sulphide that accompanies the furnace gases, is tapped from the bottom of the furnace as molten lead metal along with molten slag of low zinc content. By weight, the amount of lead vapour in the blast-furnace gases is about one-tenth that of the zinc vapour. With lead present in the smelting charge in amount chemically equivalent to the zinc (i. e. 207.2/65.4=3.15 times as much lead as zinc by weight), the blast-furnace gases will contain, by volume, about 5% zinc vapour and about 10% carbon dioxide, with about 0.16% lead vapour, which volume of lead vapour represents about 3% of the total lead in the smelting charge, the remainder of the lead in the charge being recovered as molten lead metal from the bottom of the furnace.

Not only must the blast-furnace gases be highly reducing in character, to prevent oxidation of the zinc and lead vapours, but the gases must be withdrawn from the blast furnace at a sufficiently high temperature to permit their travel to the shock-chilling zone of the condenser without appreciable oxidation of zinc vapour.

As hereinbefore explained, to reduce the amount of lead sulphide carried in the furnace gases it is desirable that the gases should leave the furnace charge at such a temperature that a further small fall in temperature will permit the zinc vapour and the carbon dioxide contained in the gases to react to form zinc oxide, and in practice we have found it advantageous to introduce a controlled amount of an oxygen-containing gas, such as air, oxygen-enriched air, or oxygen, into the blast furnace gases being withdrawn from the furnace and thereby heating the gases by the resulting oxidation of carbon monoxide therein to a temperature substantially above their initial normal temperature and sufficiently high to permit their travel to the shock-chilling zone of the condenser without appreciable oxidation of zinc vapour, as more fully described in the aforementioned Woods application Serial No. 374,322.

The invention will now be described, by way of example, as applied to the treatment of a mixed lead-zinc sulphide ore containing at least 5% of lead, where all of the smelting charge ingredients, other than the carbonaceous material, are sintered with simultaneous roasting of the sulphite ore.

The blast-furnace charge is made up of coarse porous sinter and carbonaceous material (usually coke and for convenience so herein referred to). The sinter contains all of the smelting charge ingredients other than the coke. In addition to blending all of these ingredients, sintering also serves to roast the raw or fresh lead-zinc sulphide ore and to calcine such limestone as is required to furnish the lime which may serve the dual purposes of preventing undue volatilization of sulphur from the blast furnace and of giving a slag of the desired composition. The fuel required for sintering is the combustible sulphur in the lead-zinc sulphide ore, and since the optimum fuel requirement for sintering is a determined factor, the amount of raw ore is correlated with respect to the sintering charge as a whole. Thus, the usual sintering charge preferably contains from 6% to 7% by weight of sulphur, but the sulphur content may vary from about 4% to as high as 9%, depending in some measure upon the character of the other charge ingredients; in particular, the higher the lead content of the charge, the lower is the required sulphur content of the sintering charge. The sulphur content of the ore is usually between 14% and 33%, the lower sulphur contents generally occurring with ores containing the higher ratios of lead to zinc. In making up a sintering charge, the amount of other ingredients mixed with the ore is usually from 2.5 to 5 times as great as the amount of raw ore. The bulk of such other charge ingredients may be fines from a previously sintered similar charge, lead blast-furnace slags of high zinc oxide content (e. g. 10 to 20%), and other suitable materials containing zinc and/or lead in amount warranting blast-furnace smelting.

Other sintering charge ingredients are fluxing agents such as limestone and sand (silica) in amounts to give a slag of suitable composition, and dross and blue powder returned from the stage of zinc vapour condensation. To obtain good zinc elimination in lead-zinc blast-furnace smelting, we have formed a slag of relatively high melting point, and favorable proportions of ferrous oxide (FeO), lime (CaO) and silica ($SiO_2$) in such a slag are, respectively, about 1:1.5:1.5. While of high melting point, such a slag is fluid and free-flowing in our practice where the tuyeres of the blast furnace are supplied with preheated air. The inclusion of the fluxing agents in the sintering charge assures more intimate mixing thereof with the other ingredients of the charge with attendant improvement in the smelting reactions in the blast furnace. The inclusion of limestone in the sintering charge is advantageous and important, since if added as such to the blast-furnace charge, its calcination in the blast furnace consumes so much heat near the top of the smelting charge so as to make it impracticable to attain and maintain the contemplated high temperature of the blast-furnace gases above the top level of the charge. Furthermore, the inclusion of limestone as such in the smelting charge is undesirable because of the large amount of carbon dioxide which its calcination would introduce into the blast-furnace gases. As noted above, some of the lime should be present as free lime, or in some other active form, in order to minimize the volatilization of lead sulphide.

Roughly, about 90% of the zinc vapour entering the lead-splash condenser is condensed and recovered as molten zinc metal. The remaining 10% of the zinc vapour is recovered in the dross periodically removed from the condenser and in the blue powder washed out of the condenser exhaust gases. Both the dross and blue powder contain lead, some of which is entrained from splashing molten lead in the condenser, while some comes from lead vapour in the blast furnace gases depending to some extent at least upon the relative amounts of lead and zinc in the sinter charged into the blast furnace. In our present usual lead-zinc blast furnace smelting practice, the combined dross and blue powder customarily contains by analysis about 35% zinc and 35% lead. Such lead vapour as may be condensed in the lead-splash condenser is absorbed by the circulating molten lead-zinc metal of the condensing system, and its accumulation therein may require bleeding-off of some of the molten lead-zinc metal in the system from time to time. The amount of returned dross and blue powder included in the sintering charge is approximately 4% by weight based on the dry weight of the sintering charge.

The various sintering charge ingredients are delivered in predetermined amounts to a mixer where sufficient water (not less than 5% and usually around 6% on the dry weight of the other ingredients) is added to form a mass that can be satisfactorily handled in a mixer. After thorough mixing, the sintering charge is fed to a sinter machine, such as a conventional down-draft sinter machine, and the exhaust gas of the machine is delivered to a sulphuric acid plant.

The sinter made on the machine should be porous and low in sulphur content. Sulphur in the sinter should not exceed 1.5% and preferably is less than 0.8 by weight, for the reasons hereinbefore discussed. The sinter is discharged from the machine onto a screen, conveniently of the bar or grizzly type, where the coarse sinter is separated from the fine sinter. Where insufficient sinter fines are obtained in screening to meet the amount required in making up the sinter charge, some of the coarse sinter may be crushed to provide the required amount of fine sinter. The coarse sinter is of suitable size for blast furnace practice, and to this end most of it should be over 1 inch but less than 3 inches in size.

Coarse sinter and coke in suitable proportions for smelting are delivered to a preheater. In general, with coke initially containing around 8% water and having an ash content of about 8% (on the dry basis), the coke consumption (on the initial wet basis) is about 1.1 ton per ton of zinc present plus about 25% of the weight of the other substances in the sinter other than zinc oxide and lead oxide, and in the present usual practice is approximately of the order of 40 parts of coke for 100 parts of coarse sinter containing around 30% zinc and 30% lead. The preheated charge, usually at a temperature around 850° C., is introduced into the top of the blast furnace through a suitably sealed charging device. The air introduced through tuyeres near the bottom of the blast furnace is preheated, say to a temperature around 600° C. and preferably as high as practicable. Molten slag and lead are tapped from the bottom of the furnace. The blast furnace gases accumulate in the upper part of the furnace above the level of the charge at a normal initial temperature of around 970° C., and of an initial composition usually about as follows:

| | Percent |
|---|---|
| Zinc | 5–6 |
| Lead | 0.1–0.2 |
| Carbon dioxide | 6–8 |
| Carbon monoxide | 24–27 |
| Nitrogen | 61–63 |

A controlled amount of an oxygen-containing gas, such as air, oxygen-enriched air, or oxygen, is introduced into the blast furnace gases accumulating above the level of the charge, in order to raise the temperature of the gases, say to at least 1000° C., by the oxidation of carbon monoxide, as more fully explained in the aforementioned Woods application Ser. No. 374,322. After such heating, the blast-furnace gases will contain about 1% more carbon dioxide and about 2% less carbon monoxide, while the zinc and lead concentrations may be slightly reduced owing to dilution by any nitrogen that has been introduced. Air, because of its high nitrogen content, should be preheated to a temperature around 600° C., and preferably as high as practicable, when used as the oxygen-containing gas, but preheating of oxygen (used as the oxygen-containing gas) is unnecessary, since it contains no diluent and its cooling effect upon the blast furnace gases is negligible. The oxidation of carbon monoxide by the oxygen content of the oxygen-containing gas sufficiently raises the temperature of the blast-furnace gases (e. g. to at least 1000° C.) to permit their travel and delivery to the shock-chilling zone of the condenser at a temperature above that at which any appreciable amount of zinc vapour reacts with carbon dioxide in the gases.

The blast-furnace gases, heated as hereinbefore described to a temperature substantially above their normal initial temperature, are transferred through a suitable flue system to a condenser of the shock-chilling type, such for example as the two-stage lead-splash condenser and associated molten zinc metal separator described in the aforementioned U. S. Patent 2,671,725 of Robson and Derham. The flue system is of the heat-insulated type to minimize any substantial loss of heat in the gases in the course of their travel from the blast furnace to the shock-chilling zone of the condenser, so that, even though the carbon dioxide content of the gases may have been raised to around 10% by the aforementioned oxidation of carbon monoxide, there is practically no tendency for zinc vapour to react with carbon dioxide in the gases.

Due to the relatively high concentration of carbon dioxide in the blast-furnace gases, zinc vapour will react with carbon dioxide in the gases to form zinc oxide at temperatures below about 950° C. Therefore, in order to recover the zinc in metallic form the gases should be practically instantaneously cooled through the temperature range of from about 950° C. to about 650° C. This is effected for all practical purposes, in the aforementioned lead-splash condenser, by bringing the hot gases, at a temperature not lower than 950° C., into intimate contact with a shower of molten lead whose temperature is lower than 650° C. (usually around 570° C.), whereupon zinc vapour condenses and dissolves in the molten lead. Thus, immediately upon their delivery to the condenser, the blast-furnace gases are brought into shock-chilling contact with molten lead in the first stage of the condenser. Here condensed zinc vapour dissolves in the molten lead and the zinc-rich molten lead is withdrawn from the condenser at a temperature below 650° C. (usually around 570° C.) by a pump to cooling equipment, such for example as the water-cooled trough system described in United States patent application of Keeping Ser. No. 361,041, filed June 11, 1953. The cooled molten lead, from which molten zinc separates as the lead's saturation point for zinc decreases in the course of cooling, is conducted to a separator, where at a temperature of around 450° C. the molten zinc floating on the zinc-depleted molten lead is overflowed to a collecting ladle or the like. The zinc-depleted molten lead at a temperature of about 450° C. is returned to the second stage of the lead-splash condenser, where the molten lead picks up residual zinc in the gases coming from the first stage of the condenser, with an attendant rise in temperature of the molten lead in this stage to about 470° C., and at about the latter temperature molten lead is conducted to the first stage of the condenser. In practice, the zinc-rich molten lead withdrawn from the first stage of the condenser at a temperature of about 570° C. will contain about 2.5% zinc, and the zinc-depleted molten lead returned to the second stage of the condenser at a temperature of about 450° C. will contain about 2.2% zinc. In both stages of the condenser, the flow of the gas and molten metal is continuous and counter-current.

The residual zinc in the gas exhausted from the second stage of the condenser is removed, mostly in the form of blue powder, in water scrubbers. This blue powder contains a substantial amount of lead, some of which arises from minute drops of molten lead entrained by the gas stream as it passes through the splashing molten lead in the condenser, and some arises from minute droplets which have been formed by condensation from lead vapour leaving the furnace and have failed to be trapped by the splashed molten lead in the condenser. After settling, the wet blue powder is dried and returned to the sintering charge. Dross, mostly in the form of zinc and lead oxides, is formed and accumulates in the condenser, and is periodically removed, usually by temporarily shutting down the condenser. In practice, the amount of dross slightly exceeds the amount of blue powder.

By a slag of low zinc content we mean that the slag generally contains not more than about 5% of the zinc content of the initial smelting charge introduced into the blast furnace, which represents about 95% recovery of zinc as vapour in the blast furnace gases. However, the recovery of zinc as vapour in the blast furnace gases is influenced by the ratio of slag-forming materials (that is, substantially all of the components other than zinc oxide, lead oxide and carbon) to zinc in the smelting charge, and, for example, when a sinter-roasted mixture of lead concentrates containing 75% lead with a slag containing 17% zinc is being treated the recovery of zinc as vapour may be only between 80% and 90%, this recovery being economically satisfactory when the zinciferous material charged is a slag of low zinc content. The actual zinc content of the slag, by analysis, will depend upon the amount of slag-forming materials present in the smelting charge and coke and may vary from as low as 1% up to 10%.

The invention provides an economical process for separately recovering zinc metal and lead metal from zinc ores of high lead content as well as from other metalliferous materials containing lead and zinc by a single blast furnace smelting operation. The blast furnace charge contains sufficient zinc to warrant the recovery from the blast-furnace gases of zinc metal. The lead content of the blast-furnace charge is not critical, but is at least sufficient to warrant recovery of molten lead metal from the molten product of the furnace and generally is higher than the zinc content and may in some cases be slightly more than three times the zinc content, by weight. Conveniently, the molten product may be withdrawn from the bottom of the furnace into a pot or ladle where, after settling, the supernatant slag and settled lead metal may be separated in any suitable manner. Alternatively, the blast furnace may be provided with a fore-hearth for collecting molten lead metal. The molten lead metal may contain silver, gold, copper, tin, antimony and bismuth, where the smelting charge contains any of these metals in appreciable amounts. The molten zinc metal recovered from the condensation stage will contain lead, between 0.9% and about 2%, and may contain cadmium and arsenic and part of the tin, antimony, and bismuth where present in appreciable amounts in the smelting charge.

Because of the aforementioned relative amounts of zinc and lead vapours in the blast furnace gases, the smelting charge (excluding coke) must contain lead and zinc in a ratio larger than 1:10 if any molten lead metal is to be formed at the bottom of the furnace. Since, in our lead-zinc blast furnace process, the smelting charge (excluding coke) seldom contains more than 50% zinc, it must contain more than 5% lead, and for practical economic operation should contain at least 10% lead. The limits to the ratio of lead to zinc in the smelting charge depend somewhat on the amount of slag-forming material present in the charge, and can be illustrated by the following two examples:

With a smelting charge obtained by sintering a high-grade zinc blende with relatively small amounts of flux additions, it has been found that a blast-furnace gas can be generated containing, by volume, about 6% zinc, 7% carbon dioxide, 25% carbon monoxide and 62% nitrogen. The composition of this gas, it may be noted, implies the consumption of 5.33 atoms of carbon per atom of zinc, which is equivalent to about 0.98 lb. carbon per lb. of zinc. Above the charge level in the furnace, some air (3% of the gas volume) is introduced into the gas, and the approximate composition becomes, by volume, 6% zinc, 8% carbon dioxide, 23% carbon monoxide and 63% nitrogen.

If now lead oxide is added to such a charge, the ratio of carbon to zinc being kept the same, some of the carbon monoxide will be used in reducing the lead oxide. If the weight of lead so reduced is 1.6 times the weight of zinc volatilized (the atom ratio of lead to zinc being 0.5), the volume of carbon monoxide used in reducing the lead will be 3% of the total gas volume, so that the composition of the blast-furnace gas as it leaves the charge will be, by volume, 6% zinc, 10% carbon dioxide, 22% carbon monoxide and 62% nitrogen. After introducing air (3% of the gas volume) into the blast-furnace gas, the volume composition of the gas will become 6% zinc, 11% carbon dioxide, 20% carbon monoxide and 63% nitrogen.

Where the process is practiced for sinter-roasting and blast-furnace smelting of solely a lead-zinc sulphide ore, the raw sulphide ore included in the sintering charge will be the lead-zinc sulphide ore containing at least 5% of lead, and the bulk of the other material included in the sintering operation will be sinter fines containing more than 5% lead. Due to the inclusion of dross and blue powder in the sintering charge, the sinter will always contain substantially more than 5% lead when the lead content of the fresh lead-zinc ore is about 5%, and when treating the lead-zinc ores of higher lead content the sinter will contain correspondingly higher amounts of lead.

Lead blast furnace slags can be advantageously smelted in accordance with the invention. Such slags typically contain about 14–18% zinc. To attain good elimination of zinc from such slags, such a ratio of fuel to slag is employed that the blast-furnace gas contains only about 3% zinc vapour by volume, with 3% carbon dioxide, 31% carbon monoxide and 63% nitrogen. After introducing 3% by volume of air into the blast-furnace gas above the charge level, the volume gas composition becomes about 3% zinc, 4% carbon dioxide, 29% carbon monoxide, 64% nitrogen. It is accordingly feasible to add to the smelting charge lead oxide so that 2 atoms of lead are present per atom of zinc, whereby the weight of lead present in the charge is about 6.3 times the weight of zinc. The composition of the blast-furnace gas, by volume, is 3% zinc, 9% carbon dioxide, 25% carbon monoxide, and 63% nitrogen. After introducing 3% by volume of air into the blast-furnace gas its composition becomes 3% zinc, 10% carbon dioxide, 23% carbon monoxide, and 64% nitrogen. From such a gas the zinc can be condensed in a lead-splash condenser, which indeed can deal with gases containing down to 2% zinc by volume. With 3% of zinc vapour in the blast-furnace gas, the carbon consumption is 11⅓ atoms per atom of zinc, or about 2.1 lbs. of carbon per lb. of zinc. With 2% of zinc vapour in the blast furnace gas, the carbon consumption would be about 3.1 lbs. per lb. of zinc. It is because the ratio of carbon consumption to zinc becomes uneconomically high as the zinc vapour concentration in the blast-furnace gas decreases that treating a gas containing less than 2% zinc is not warranted, rather than because there is any definite failure of the lead-splash condenser at such low zinc concentrations.

The invention permits the inclusion of lead oxide in a zinc-smelting blast-furnace charge until the reduction of lead oxide by carbon monoxide causes the carbon-dioxide content of the blast-furnace gas to rise to any point not exceeding about 11% by volume. The permissible inclusion of lead oxide, in relation to the zinc in the charge, is therefore particularly high when the zinciferous material is a low-grade product such as a blast-furnace slag, where, in the absence of lead oxide, the zinc content of the gas would be low and the carbon-dioxide content would also be low.

A smelting plant that has been separately smelting zinc and lead concentrates obtained by froth flotation from a mixed sulphide ore will generally have accumulated a stock of a zinc-containing lead blast-furnace slag. Such a plant, adopting the present invention, may now directly treat the mixed sulphide ore, by sinter-roasting, with addition of an appropriate amount of lead blast-furnace slag to the smelting charge, thus gradually working off the dumps of this material. The slag may be included in the sintering charge or separately preheated and added to the blast furnace.

A smelting plant that has been treating only lead concentrates in a blast furnace will also have accumulated the same type of zinciferous blast furnace slag. By the present invention, such a plant may recover zinc from the zinciferous slag and simultaneously smelt fresh lead concentrate. Although the lead blast-furnace slag will contain a little lead and the lead ore a little zinc, this is incidental. In principle, the advantage of the invention would be obtained were the smelting charge made up of a mixture of lead-free franklinite and zinc-free roasted galena.

Where the zinc smelter does not practice sulphide-sintering, but roasts the sulphide ore to form oxidized zinc compounds, the roasted ore may be coke-sintered and the resulting sinter smelted in accordance with the principles of the invention. A suitable coke-sintered product for smelting in accordance with the invention may be made by sintering a charge of about the following composition:

| | Parts |
|---|---|
| Roasted ore | 57 |
| Recirculated material (dross etc.) | 12 |
| Limestone | 23 |
| Sand | 6 |
| Coke | 2 |

The aim in coke-sintering is to obtain the whole of the sinter cake in a form suitable for smelting in a blast furnace without recycling the sintered product. Some fine material, however, is always obtained, usually in small amount, and this is returned for sintering with another charge of roasted ore.

It will be clear to those skilled in this art that the above data is by way of illustrating the invention, and that the invention lends itself to various modifications in practice.

We claim:

1. In the method of operating a zinc blast furnace in which a preheated charge containing oxidic zinc materials and carbonaceous fuel is introduced into the top of the furnace, preheated air is blown into the bottom of the furnace, molten slag is tapped from the bottom of the furnace, a gas containing zinc vapour, carbon monoxide and carbon dioxide is withdrawn from a higher part of the furnace and passed into a condenser to recover molten zinc, the improvement which comprises incorporating a substantial amount of oxidic lead compounds in the charge and regulating the amount of combustible carbon charged so that the heat generated by combustion of this carbon in the preheated air to produce a mixture of carbon monoxide and carbon dioxide in such a ratio that this gaseous mixture is highly reducing to the oxidic zinc and lead compounds present in the slag formed in the furnace, together with the heat generated by the exothermic reaction between the oxidic lead compounds and carbon monoxide to produce lead metal and carbon dioxide, is substantially no more than that necessary (a) for compensating for heat losses from the furnace, (b) for reducing the oxidic zinc compounds endothermically by carbon monoxide to produce zinc vapour and carbon dioxide, (c) for melting substantially all of the charge components other than zinc oxide, lead oxide and carbon, and maintaining the resultant slag at such an elevated temperature that substantially all the zinc and lead oxides dissolved therein are reduced to liberate zinc vapour and lead metal, (d) for raising the temperature of the gases in the zone of the furnace where they last make contact with the furnace charge to a point at which the zinc vapour contained therein cannot react with the carbon dioxide contained therein to form undesired zinc oxide, and (e) for volatilizing some of the lead metal formed, the amount of lead volatilized not being substantially above that unavoidable minimum amount required to saturate the gases leaving the charge with lead vapour at the temperature at which these gases finally leave the charge; the gases being brought into intimate shock-chilling contact with molten lead in the condenser to facilitate condensation of the zinc vapour to molten zinc and withdrawing molten lead from the bottom of the furnace.

2. Method according to claim 1, in which the sulphur content of the charge does not exceed about 1.5%.

3. Method according to claim 1, in which the sulphur content of the charge is less than 0.8%.

4. Method according to claim 1, in which the lead content of the charge is substantially in excess of 5% of the weight of carbon burned.

5. Method according to claim 1, in which free lime is present in the charge to react with a substantial portion of the sulphide compounds present in the charge and gases to form calcium sulphide and thereby substantially inhibit the volatilization of lead sulphide.

6. Method according to claim 1, in which the sulphur content of the charge does not exceed about 1.5%, and free lime is present in the charge to react with a substantial portion of the sulphide compounds present in the charge and gases to form calcium sulphide and thereby substantially inhibit the volatilization of lead sulphide.

7. Method according to claim 1, in which the sulphur content of the charge is less than 0.8%, and free lime is present in the charge to react with a substantial portion of the sulphide compounds present in the charge and gases to form calcium sulphide and thereby substantially inhibit the volatilization of lead sulphide.

8. Method according to claim 1, in which the temperature of the gases where they last make contact with the charge is only slightly above the equilibrium temperature below which the zinc vapour could react with the carbon dioxide to form zinc oxide thereby inhibiting the passage of lead sulphide to the condenser.

9. Method according to claim 1, in which the gases are withdrawn from the top free level of the charge, where they are in contact with freshly introduced charge material, and the temperature of the gases where they last make contact with the top of the charge is only slightly above the equilibrium temperature below which the zinc vapour could react with the carbon dioxide to form zinc oxide thereby inhibiting the passage of lead sulphide to the condenser.

10. Method according to claim 1, in which a controlled amount of an oxygen-containing gas is introduced directly into the gaseous product withdrawn from the charge, and the gaseous product is heated by the resulting oxidation of carbon monoxide to a temperature to ensure that no appreciable amount of the zinc vapour reacts with carbon dioxide during the passage of the gaseous product to the condenser.

11. Method according to claim 1, in which the temperature of the gases where they last make contact with the charge is only slightly above the equilibrium temperature below which the zinc vapour could react with the carbon dioxide to form zinc oxide, the passage of lead sulphide to the condenser thus being inhibited; a controlled amount of oxygen containing gas is introduced directly into the gases so withdrawn; and the gases are heated by the resulting oxidation of carbon monoxide to a temperature to ensure that no appreciable amount of the zinc vapour reacts with carbon dioxide during the passage of the gases to the condenser.

12. Method according to claim 1, in which the zinc content of the metalliferous material is derived for the most part from the inclusion therein of a lead blast-furnace slag containing at least 10% of zinc.

13. Method according to claim 1, in which the charge includes as its main metalliferous components zinc-containing lead blast-furnace slag and sinter-roasted lead sulphide ore.

14. Method according to claim 1, in which dross from the condenser is sintered, and the resulting sinter is added to the charge.

15. Method according to claim 1, in which blue powder obtained by scrubbing the gases coming from the condenser is sintered, and the resulting sinter is added to the charge.

16. Method according to claim 1, in which copper is present in the charge, molten lead accumulates in the bottom of the furnace in amount to dissolve the copper, and the copper is tapped in solution with the lead.

17. Method according to claim 1, in which silver is present in the charge, molten lead accumulates in the bottom of the furnace in amount to dissolve the silver, and the silver is tapped in solution with the lead.

18. In the method of recovering zinc by a blast furnace operation in which a preheated charge containing oxidic zinc materials and carbonaceous fuel is introduced into the top of the furnace, preheated air is blown into the bottom of the furnace, molten slag is tapped from the bottom of the furnace, a gas containing zinc vapor, carbon monoxide and carbon dioxide is withdrawn from a higher part of the charge and passed into a condenser to recover molten zinc, the improvement which comprises specially adding a substantial amount of oxidic lead compounds to the charge, and using substantially no more carbonaceous fuel in the charge than that normally required to reduce the zinc oxide and to condense and recover the molten zinc, said carbonaceous fuel being sufficient also to reduce the lead oxide to lead metal, and separately recovering molten lead from the lower part of the charge.

References Cited in the file of this patent

UNITED STATES PATENTS

| | | |
|---|---|---|
| 487,444 | Hunicke | Dec. 6, 1892 |
| 1,072,209 | Desgraz | Sept. 2, 1913 |
| 1,652,184 | Skogmark | Dec. 13, 1927 |
| 1,949,905 | Hall | Mar. 6, 1934 |

FOREIGN PATENTS

| | | |
|---|---|---|
| 5,438 | Great Britain | 1913 |